(12) United States Patent
Kodumudi et al.

(10) Patent No.: US 6,223,811 B1
(45) Date of Patent: May 1, 2001

(54) SUPPORT FOR A COOLING DEVICE

(75) Inventors: Magesh V. Kodumudi, Rochester Hills; Charles W. Prater, Highland, both of MI (US)

(73) Assignee: Valeo Inc., Auburn Hills, MI (US)

( * ) Notice: Subject to any disclaimer, the term of this patent is extended or adjusted under 35 U.S.C. 154(b) by 0 days.

(21) Appl. No.: 09/166,466

(22) Filed: Oct. 5, 1998

(51) Int. Cl.[7] ........................................ F24H 3/02
(52) U.S. Cl. .................. 165/121; 165/41; 165/67; 180/68.4
(58) Field of Search .................. 165/121, 41, 140, 165/67; 180/68.4

(56) References Cited

U.S. PATENT DOCUMENTS

| | | | |
|---|---|---|---|
| 4,137,982 | 2/1979 | Crews et al. | 180/68.4 |
| 4,763,723 | 8/1988 | Granetzke | 165/67 |
| 4,997,033 | 3/1991 | Ghiani et al. | 165/167 |
| 5,269,367 | 12/1993 | Sisa et al. | 165/67 |
| 5,271,473 | 12/1993 | Ikeda et al. | 180/68.4 |
| 5,287,940 | 2/1994 | Ogawa et al. | 180/68.4 |
| 5,341,871 | 8/1994 | Stelzer | 165/121 |
| 5,522,457 | 6/1996 | Lenz | 165/121 |
| 5,566,748 | 10/1996 | Christensen | 165/67 |
| 5,704,418 | 1/1998 | Baader et al. | 165/121 |

*Primary Examiner*—Ira S. Lazarus
*Assistant Examiner*—Terrell McKinnon
(74) *Attorney, Agent, or Firm*—Morgan & Finnegan LLP

(57) ABSTRACT

A support for a cooling device which consists of a heat exchanger and a fan shroud for a cooling fan, has a resilient body portion adapted to simultaneously engage the heat exchanger and the fan shroud.

Where the cooling device further comprises a second heat exchanger, such as a condenser, the support has a further portion adapted to engage the condenser.

The support allows the assembled components to be protected from vibration.

16 Claims, 3 Drawing Sheets

SUPPORT FOR A COOLING DEVICE

FIELD OF THE INVENTION

The present invention relates to a support for a cooling device. In particular, an embodiment of the present invention relates to a support for supporting an automotive cooling device comprising a fan shroud and a heat exchanger within a vehicle.

BACKGROUND OF THE INVENTION

U.S. Pat. No. 5,219,016 (Bolton et al.) discloses a cooling device having a fan shroud, a radiator and a condenser supported as a combination within an automobile. The cooling device is assembled by hanging the condenser off one side of the radiator and the fan shroud off the other side of the radiator. The base of the radiator is supported by a part of the automobile and the assembled cooling device is held in a position within the automobile by a mounting panel which is disposed to apply a downward pressure on the fan shroud, the radiator and the condenser. Resilient material is used as an intermediary between the radiator and that part of the automobile which supports its base and the top of the radiator and the mounting panel. The resilient material helps to insulate the assembled cooling device from the vibrations of the automobile.

The arrangement of the prior art is complicated to manufacture and assemble. Also, although the fan shroud, the radiator and the condenser are constrained to limit their movement relative to one another they are constrained by different elements and consequently different forces. This may permit relative movement between the fan shroud or condenser and the radiator, which may cause shear stresses to occur.

It would be advantageous to address these problems and in particular to provide a simple support which allows for the assembled components of a cooling device to be protected from vibrations.

An object of the invention is to provide a support which at least partly mitigates the problems of the prior art.

SUMMARY OF THE INVENTION

According to one aspect of the present invention there is provided a support for a cooling device comprising at least a heat exchanger and a fan shroud, having a resilient body portion which is adapted to simultaneously engage the heat exchanger and fan shroud of the cooling device.

Preferably the body portion has wall portions defining respective cavities for engaging said heat exchanger and said fan shroud, the cavities being dimensioned to resiliently retain said heat exchanger and fan shroud.

Conveniently the body portion comprises elastomeric material. Advantageously the support comprises a first upper elastomeric layer, a second lower elastomeric layer and an intermediate layer of reinforcing mesh material.

Conveniently said mesh material comprises steel.

According to a second aspect of the present invention there is provided a support for a cooling device comprising a heat exchanger, a fan shroud for a cooling fan and a condenser, the support having a resilient body portion adapted to simultaneously engage the heat exchanger, the fan shroud and the condenser.

Preferably the body portion has wall portions defining respective cavities for engaging said heat exchanger, said fan shroud and said condenser, the cavities being dimensioned to resiliently retain said heat exchanger, fan shroud and condenser.

Advantageously the body portion is of elastomeric material.

Conveniently the support comprises a first upper elastomeric layer, a second lower elastomeric layer and an intermediate layer of reinforcing mesh material.

Advantageously the mesh material comprises steel.

According to a further aspect of the present invention there is provided a support for a cooling device comprising a heat exchanger and a fan shroud associated with the heat exchanger, the support comprising a body having a peripheral edge, a fan shroud cavity and a heat exchanger cavity, said peripheral edge defining a periphery of the fan shroud cavity and separately defining a periphery of the heat exchanger cavity, wherein said fan shroud cavity extends into the body and is adapted to receive and engage a fan shroud and said heat exchanger cavity extends into the body and is adapted to receive and engage a heat exchanger.

According to yet a further aspect of the present invention there is provided in combination:

a heat exchanger having peripheral portions;

a fan co-operating with the heat exchanger;

a fan shroud associated with the fan and the heat exchanger having peripheral portions; and a support for engaging the fan shroud and the heat exchanger having a resilient body defining:

a first wall portion adapted to engage portions of the periphery of said fan shroud;

a second wall portion adapted to engage portions of the periphery of said heat exchanger; and spacer means for spacing said heat exchanger from said fan shroud, said body further comprising securing means for securing said heat exchanger to said support.

BRIEF DESCRIPTION OF THE DRAWINGS

The novel features believed characteristic of the present invention are set forth in the appended claims. The invention itself, however, as well as a preferred mode of use, and further objects and advantages thereof, will best be understood by a reference to the following detailed description of illustrated embodiments when read in conjunction with the accompanying drawings, wherein:

DETAILED DESCRIPTION

Figure 1:
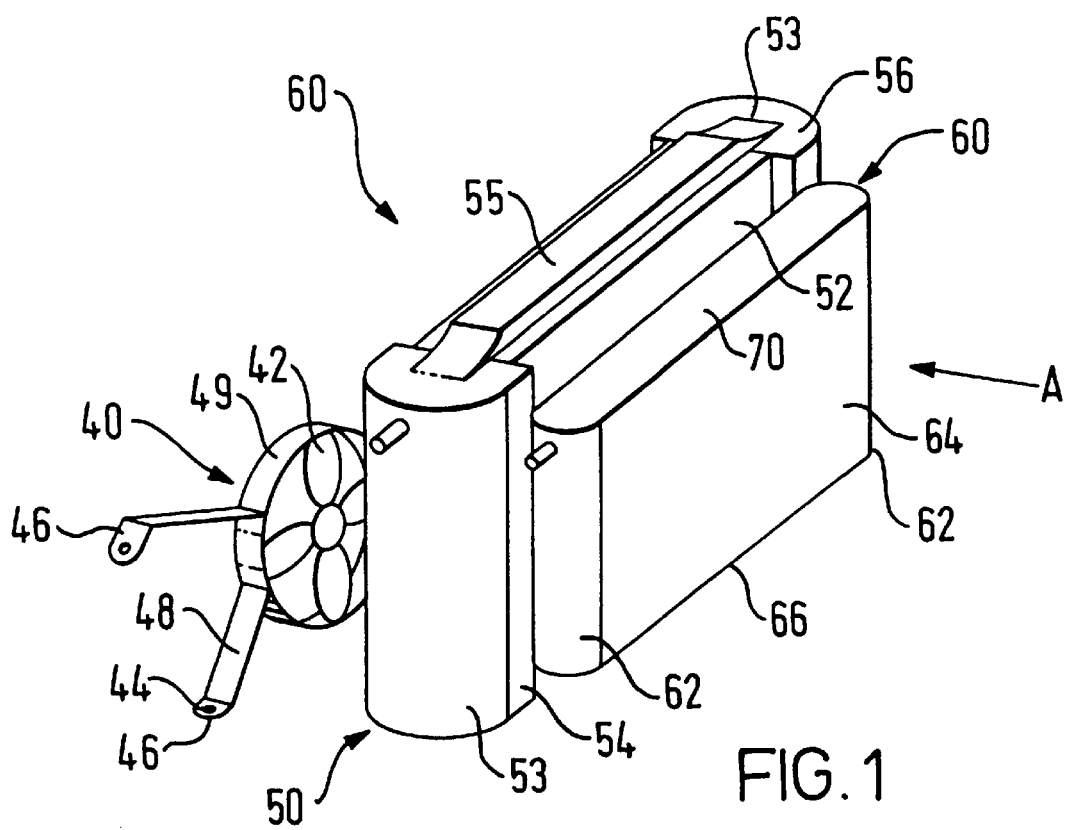
FIG. 1 illustrates an exploded perspective view of a cooling device comprising a fan shroud, a radiator and a condenser.

In the following description like reference numerals refer to like parts.

Reference will first be made to FIG. 1 to illustrate the manner in which a fan shroud, a radiator and a condenser co-operates in combination to function as a cooling device for an automobile. The figure illustrates an exploded view of a cooling device 60. In use a fan shroud 40, a radiator 50 and a condenser 60 are supported in close proximity to each other, with the condensor foremost with respect to the direction (shown in arrow A) of incoming air and the radiator 50 between the condensor and the fan shroud 40. The fan shroud 40 houses a fan which moves air through the core 52 of the radiator 50 and the core 64 of the condensor 60. The fan shroud 40 has four fan shroud mounting portions 46 which are lugs, each having a planar portion with one semicircular end portion defining a fixing hole 44, the planar portion extending into a respective arm portion 48. Each arm portion 48 extends into an air guide portion 49 within which the fan 42 rotates. Two of the fan shroud mounting portions 46 are illustrated in the figure.

The radiator 50 has two tank portions 53 disposed vertically and opening into respective headers 54, 56. The headers 54, 56 are vertically disposed, and are connected by the tubes of the core 52 which run generally horizontally in the view of FIG. 2. To afford structural integrity the headers 54,56 are secured together by radiator side plates 55, disposed top and bottom of the core 52. The side plates are generally rectangular channel members projecting from the core. The condenser 60 has two condenser tanks 62, coupled via the tubes of the condenser core 64. The tanks 62 are disposed vertically to each side of the core. They have a generally semicircular cross-section on the horizontal plane.

In use, the fan 46 is caused to rotate by an associated motor which is supported by arms (not shown) within the circular air guide portion 49 of the shroud. The rotation causes a relatively reduced pressure within the confines of the fan shroud, and air is thus induced in the direction of the arrow A via the condenser 62 and the radiator 56, in the process condensing refrigerant in the condenser and cooling coolant in the radiator. The fan shroud, as known in the art, effectively prevents reflux of air from the downstream side of the fan into the reduced pressure region.

In the embodiment, the fan shroud, the radiator and the condenser are engaged by four supports, each at a respective corner of the cooling module and composed of a resilient body. An exemplary ore of these will now be described with reference to FIGS. 2, 3 and 4.

Figure 2:
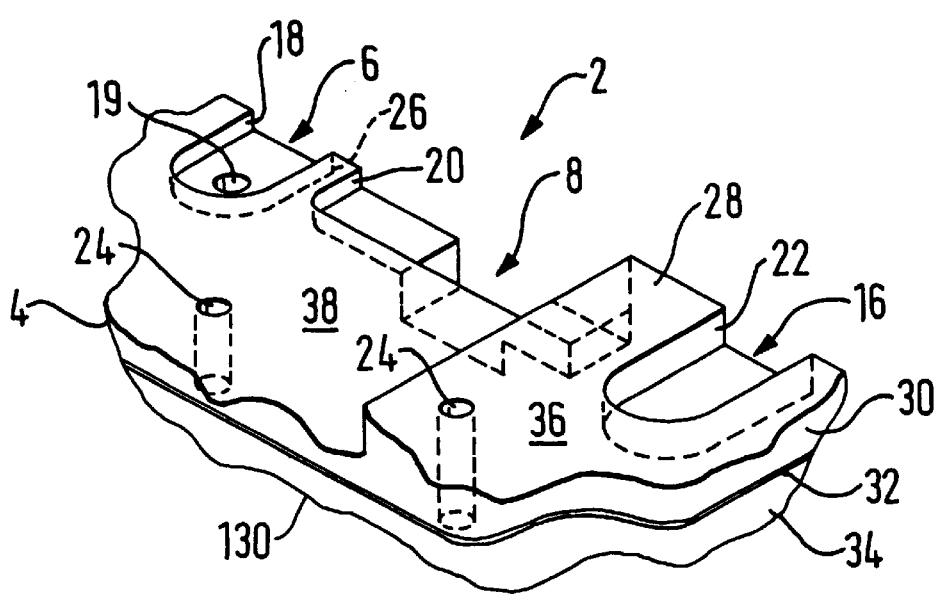
FIG. 2 illustrates a perspective view of a cooling device support according to a preferred embodiment of the present invention.

The support 2 has a three dimensional body 4 which has a maximum thickness in a first direction which is less than its lateral width in a second direction, its lateral extent being less than its longitudinal length in a third direction. In the orientation shown in FIG. 2, the body has a generally planar lower surface 130, a first upper surface portion 38 which is generally planar to define a first region 37 of first thickness and an adjacent second upper surface portion 36 which is also generally planar. The second upper surface portion 36 is vertically offset from the first upper surface portion 38 to provide a second region 39 of greater thickness than that of first region 37, which as will be later described permits the condenser to be correctly supported. A peripheral edge of the body has a substantially straight portion which extends the length of the body and an irregular portion extending from one end of the straight portion to the other end of the straight portion. The irregular edge portion is tapered inwardly with respect to a vertical direction as seen in FIG. 2, from where it meets the generally planar surface towards the lower surface. Thus the extent of the lower surface 130 is less than that of the upper surface 36,38. The configuration of the irregular edge portion is selected for the reception of the body in a corresponding aperture in a vehicle structure. The lower surface 130 has an undulating contour which facilitates compression of the body.

The body has three distinct cavities 6, 8, 16 defined therein and exposed at the generally planar upper surface. Each of the cavities extends downwardly as seen in FIG. 2 into the upper surface and in the second width direction from the straight portion of the edge to define cavities each of which has lateral and longitudinal extent in the second and third directions. The three cavities are hereinafter referred to as the fan shroud cavity 6, the radiator cavity 8 and the condenser cavity 16.

The fan shroud cavity 6 is configured to receive the fan shroud mounting portion 46. The fan shroud cavity 6 has a fan shroud cavity wall 18 defining the perimeter of the cavity, to correspond to configuration of the fan shroud mounting portions, namely having a semicircular cavity end portion. The base wall of the cavity has a hole 19 for receiving a fixing screw (not shown) passing in use through the hole 44 of the mounting portion and into the body work of the vehicle.

The radiator cavity 8 is configured to receive the radiator header 54 and the radiator side plate 55. The radiator cavity 8 has a radiator header cavity 10 which is generally rectangular for engaging the walls of the header 54, and a radiator side plate cavity 12, which is also rectangular and extends into the base of the radiator header cavity 10 downwardly in the orientation of FIG. 2, for engaging the walls of the side plate 55.

The condenser cavity 16 is adapted to receive a condenser tank 62, and accordingly has a condenser cavity wall defining the perimeter of the cavity to conformally engage the external semicircular shape of the condensor tank. It will of course be appreciated that the particular shape of the cavity will be determined by the shape of the condensor.

The fan shroud cavity 6 is separated from the radiator cavity 8 by a first separating portion 26 of the body 4. The first separating portion 26 is an integral part of the body 4 in the illustrated preferred embodiment.

The condenser cavity 16 is separated from the radiator cavity 8 by a second separating portion 28 of the body 4. The second separating portion 28 is an integral part of the body 4 in the illustrated preferred embodiment.

Figure 3:
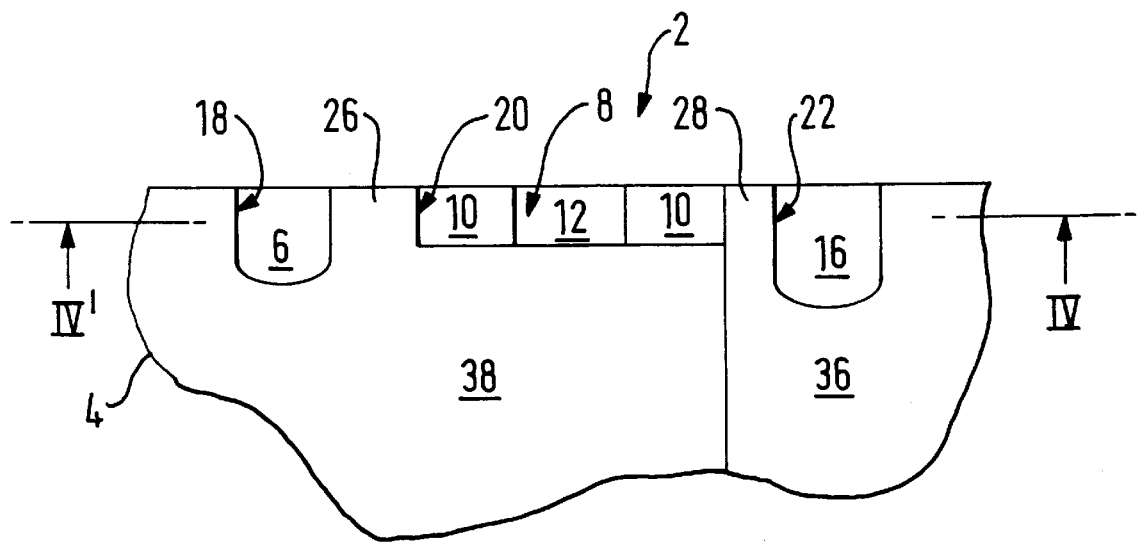
FIG. 3 illustrates a top plan views of the support illustrated in FIG. 2.
Figure 4:
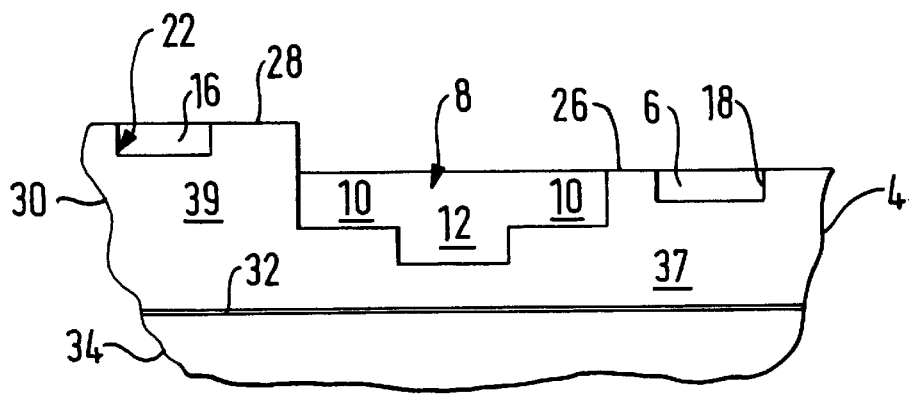
FIG. 4 illustrates a cross sectional view of the support illustrated in FIGS. 2 and 3, wherein the cross-section is taken at the line A—A illustrated in FIG. 3

Referring now to FIG. 3, it can be seen that the condenser cavity 16 is defined in the second region 39 of the body 4, which has a greater thickness than the first region 37 of the body 4 in which the fan shroud cavity 6 and the condenser cavity 16 are defined. The difference in elevation provides for the condenser 52 to be supported in the condenser cavity 16 at an elevation which is different to that at which the fan shroud 40 and radiator 44 are supported by their respective cavities. It should be appreciated that the particular disposition of cavities is determined by the form and disposition of the elements of the cooling device.

The body 4 has three distinct layers: a first top layer 30; a second bottom layer 34 and an intermediate layer 32 disposed between the first layer 30 and the second layer 34.

The second bottom layer 34 is formed from a resilient material. This layer could be any elastomeric material such as natural or synthetic rubber. The layer 34 of the body is in use engaged in an aperture of a vehicle body, as has been discussed and the resilient material reduces the transmission of vibrations from the vehicle to the cooling device.

The intermediate layer 32 is formed from a sheet of steel mesh to provide additional strength. The intermediate layer 32 lies between the first layer 30 and the second layer 34. It is preferably made of steel. The first and second layers 30, 34 are formed from rubber which may be natural or artificial.

The fan shroud cavity 6 is formed wholly within the resilient: first top layer 30. The cavity has dimensions somewhat smaller than the dimensions of the fan shroud mounting portion. The size differential is selected in concert with the properties of the top layer to allow insertion of the fan shroud mounting portion. When the fan shroud mounting portion is inserted into the fan shroud cavity 6, the fan shroud cavity wall 18 is distorted outwardly from its equilibrium position to grip the fan shroud mounting portion, thereby to retain the fan shroud 40.

The radiator cavity 8 is formed wholly within the first resilient layer 30 and is likewise sufficiently smaller than the dimensions of the portions of the radiator header 48 and radiator side plate 50 it is designed to receive to allow insertion and retention of the radiator.

The condenser cavity 16 is formed wholly within the resilient first layer 30. The cavity is sized so that its dimensions are smaller than the dimensions of the portion of the condenser tank 54 it is designed to receive. When the condenser tank 54 is received by the condenser cavity 16, the condenser cavity wall 22 is distorted from its equilibrium position, and grips the portions of condenser tank 54 adjacent the condenser tank edge portions 56, thereby facilitating the retention of the condenser 52 in the condenser cavity 16.

The use of a resilient material for the first top layer 30 in which the fan shroud cavity 6, the radiator cavity 8 and the condenser cavity 16 are defined as well as providing retention of the associated components also dampens the transmission of vibrations to and between those components.

The support 2 has holes 24 in its body 4. The holes pass through thickness of the body. In use screws or studs pass through the holes 24 for attachment of the support, or for attachment of retaining screws to the support.

Figure 5:
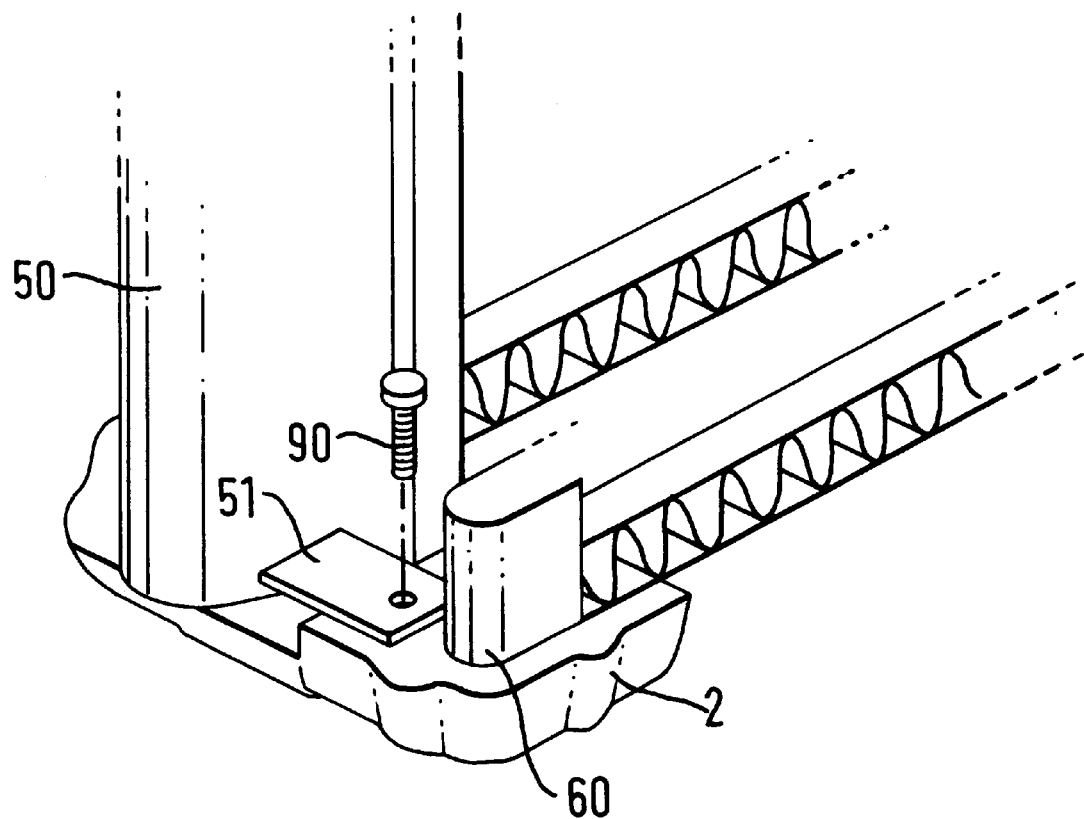
FIG. 5 illustrates a support according to a preferred embodiment of the present invention in combination with the cooling device illustrated in FIG. 1.

Referring now to FIG. 5 the support 2 is shown in combination with the condenser 60 and the radiator 50. A bolt 90 passes into one of the holes 24 via a hole in a bracket 51 which extends outwardly from the tank 52 of radiator 50. This serves to secure the radiator to the support. A similar bolt passes through a similar bracket on the other side of the tank 56 into the second hole 24 (obscured by tank 56).

A bolt passes through the support of the fan shroud into the fixing hole 19 of the fan shroud cavity (also obscured by radiator tank 56).

As will be appreciated by those skilled in the art the support as particularly described above may have cavities of different shapes and size and of differing relative orientations and elevations when adapted to support a different cooling device.

While the invention has been particularly shown and described with reference to a preferred embodiment, it will be understood by those skilled in the art that various changes in form and detail may be made therein without departing from the spirit and scope of the invention.

What we claim is:

1. A support for a cooling device comprising a heat exchanger and a fan shroud for a cooling fan, the support having a resilient body portion adapted to simultaneously engage the heat exchanger and the fan shroud, and wherein the support comprises a first upper elastomeric layer, a second lower elastomeric layer and an intermediate layer of reinforcing material.

2. The support of claim 1, wherein said body portion has wall portions defining respective cavities for engaging said heat exchanger and said fan shroud, the cavities being dimensioned to resiliently retain said heat exchanger and fan shroud.

3. The support of claim 1 wherein said body portion comprises elastomeric material.

4. The support of claim 1 wherein the reinforcing material comprises mesh material.

5. The support of claim 4 wherein said mesh material comprises steel.

6. A support for a cooling device comprising a heat exchanger, a fan shroud for a cooling fan and a condenser, the support having a resilient body portion adapted to simultaneously engaged the heat exchanger, the fan shroud and the condenser, and wherein the support comprises a first upper elastomeric layer, a second lower elastomeric layer and an intermediate layer of reinforcing material.

7. The support of claim 6 wherein the reinforcing material comprises mesh material.

8. The support of claim 6 wherein said mesh material comprises steel.

9. A support for a cooling device comprising a heat exchanger and a fan shroud associated with the heat exchanger, the support comprising a body having a peripheral edge, a fan shroud cavity and a heat exchanger cavity, said peripheral edge defining a periphery of the fan shroud cavity and separately defining a periphery of the heat exchanger cavity, wherein said fan shroud cavity extends into the body and is adapted to receive and engage a fan shroud and said heat exchanger cavity extends into the body and is adapted to receive and engage a heat exchanger, wherein the support comprises a first elastomeric layer, a second elastomeric layer, and an intermediate layer of reinforcing material.

10. The support of claim 9, wherein said fan shroud cavity and said heat exchanger cavity have a dimension that is smaller than the dimension of the fan shroud and the heat exchanger, respectively, wherein the size differential is configured so that said fan shroud cavity and said heat exchanger cavity snugly hug the fan shroud and the heat exchanger, respectively.

11. The support of claim 9 wherein the reinforcing material comprises mesh material.

12. The support of claim 9 wherein said fan shroud cavity and said heat exchanger cavity are formed wholly in the first elastomeric layer.

13. The support of claim 9 wherein the body of the support defines an upper surface having one or more sections wherein a section varies from another section in elevations to support a member of the cooling device.

14. The support of claim 13 wherein each section has at least one cavity for engaging a member of the cooling device.

15. The support of claim 11 wherein said mesh material comprises steel.

16. An apparatus, comprising:
 a heat exchanger having peripheral portions;
 a fan co-operating with the heat exchanger;
 a fan shroud associated with the fan; and
 a support for engaging the fan shroud and the heat exchanger, the support comprising a first and second elastomeric layer and an intermediate reinforcing layer, the support defining:
  a first wall portion adapted to engaged portions of the periphery of said fan shroud;
  a second wall portion adapted to engage portions of the periphery of said heat exchanger; and
  spacer means for spacing said heat exchanger from said fan shroud,
  said body further comprising securing means for securing said heat exchanger to said support.

\* \* \* \* \*

UNITED STATES PATENT AND TRADEMARK OFFICE
CERTIFICATE OF CORRECTION

PATENT NO.     : 6,223,811 B1
DATED          : May 1, 2001
INVENTOR(S)    : Kodumudi et al.

It is certified that error appears in the above-identified patent and that said Letters Patent is hereby corrected as shown below:

Column 6,
Line 8, "engaged" should read -- engage --.
Line 14, "claim 6" should read -- claim 7 --.

Signed and Sealed this

Eighteenth Day of June, 2002

*Attest:*

*Attesting Officer*

JAMES E. ROGAN
*Director of the United States Patent and Trademark Office*